United States Patent [19]
Adomeit et al.

[11] Patent Number: 6,095,549
[45] Date of Patent: Aug. 1, 2000

[54] AIRBAG SYSTEM FOR MOTOR VEHICLES

[75] Inventors: Dieter Adomeit; Falk Ose, both of Berlin, Germany

[73] Assignee: Petri AG, Aschaffenburg, Germany

[21] Appl. No.: 09/004,700

[22] Filed: Jan. 8, 1998

[30]     Foreign Application Priority Data

May 2, 1997 [DE] Germany ............................ 197 20 149

[51] Int. Cl.[7] ............................ B60R 21/16; B60R 21/05
[52] U.S. Cl. ........................ 280/728.2; 280/731; 280/750
[58] Field of Search .............................. 280/728.2, 731, 280/777, 750, 732

[56]                 References Cited

U.S. PATENT DOCUMENTS

| | | | |
|---|---|---|---|
| 3,887,215 | 6/1975 | Albrecht et al. | 280/150 AB |
| 4,200,309 | 4/1980 | Korn et al. | 280/750 |
| 4,334,699 | 6/1982 | Patzelt et al. | 280/731 |
| 4,771,650 | 9/1988 | Kerner | 74/498 |
| 4,989,895 | 2/1991 | Pearson et al. | 280/731 |
| 5,005,860 | 4/1991 | Mori et al. | 280/731 |
| 5,209,510 | 5/1993 | Mamiya | 280/732 |
| 5,234,229 | 8/1993 | Gordon | 280/736 |
| 5,267,486 | 12/1993 | Niwa et al. | 74/552 |
| 5,295,712 | 3/1994 | Omura | 280/777 |
| 5,333,897 | 8/1994 | Landis et al. | 280/728 A |
| 5,383,682 | 1/1995 | Nagata et al. | 208/777 |
| 5,826,901 | 10/1998 | Adomeit | 280/728.2 |

FOREIGN PATENT DOCUMENTS

| | | |
|---|---|---|
| 0199024 | 10/1986 | European Pat. Off. . |
| 0357225 | 3/1990 | European Pat. Off. . |
| 0582107 | 2/1994 | European Pat. Off. . |
| 3527581 | 2/1987 | Germany . |
| 3621226 | 1/1988 | Germany . |
| 3710173 | 10/1988 | Germany . |
| 92054854 | 9/1992 | Germany . |
| 4211674 | 10/1993 | Germany . |
| 4225671 | 2/1994 | Germany . |
| 4227559 | 2/1994 | Germany . |
| 44 30 588 C1 | 10/1995 | Germany . |
| 1-247241 | 10/1989 | Japan . |
| 4-135944 | 5/1992 | Japan . |
| 4-166458 | 6/1992 | Japan . |
| 4-303050 | 10/1992 | Japan . |
| 4-303051 | 10/1992 | Japan . |
| 1367954 | 9/1974 | United Kingdom . |
| 1588919 | 4/1981 | United Kingdom . |
| 2270883 | 3/1994 | United Kingdom . |
| WO9009297 | 8/1990 | WIPO . |
| WO 97/25237 | 7/1997 | WIPO . |

OTHER PUBLICATIONS

Patent Abstracts of Japan, Publication No. JP4166458, Publication Date Jun. 12, 1992, Application No. JP900294206, Application Date Oct. 30, 1990.
Patent Abstracts of Japan, Publication No. JP5016749, Publication Date Jan. 26, 1993, Application No. JP910166547. Application Date Jul. 08, 1991.
Patent Abstracts of Japan, Publication No. JP5024542, Publication Date Feb. 02, 1993, Application No. JP910187172, Application Date Jul. 26, 1991.
Patent Abstracts of Japan, Publication No. JP6001196, Publication Date Jan. 11, 1994, Application No. JP930011950, Application Date Jan. 27, 1993.
Patent Abstracts of Japan, Publication No. JP6032196, Publication Date Feb. 08, 1994, Application No. JP920214482, Application Date Jul. 20, 1992.
Patent Abstracts of Japan, Publication No. JP6293245, Publication Date Oct. 21, 1994, Application No. JP930081750, Application Date Apr. 08, 1993.

*Primary Examiner*—Paul N. Dickson
*Attorney, Agent, or Firm*—Christie, Parker & Hale, LLP

[57]                 ABSTRACT

An airbag system for motor vehicles with at least one gas bag and at least one associated gas generator, whereby the airbag system is at least partially shiftable by the occupant. The section of the airbag system shiftable by the occupant is supported by at least one deformable element or shiftable element. This deformable element or shiftable element is deformable or shiftable with a lower expenditure of force with ignition of the gas generator than with a slight deceleration of the vehicle and no ignition of the gas generator by action of the impacting occupant.

20 Claims, 6 Drawing Sheets

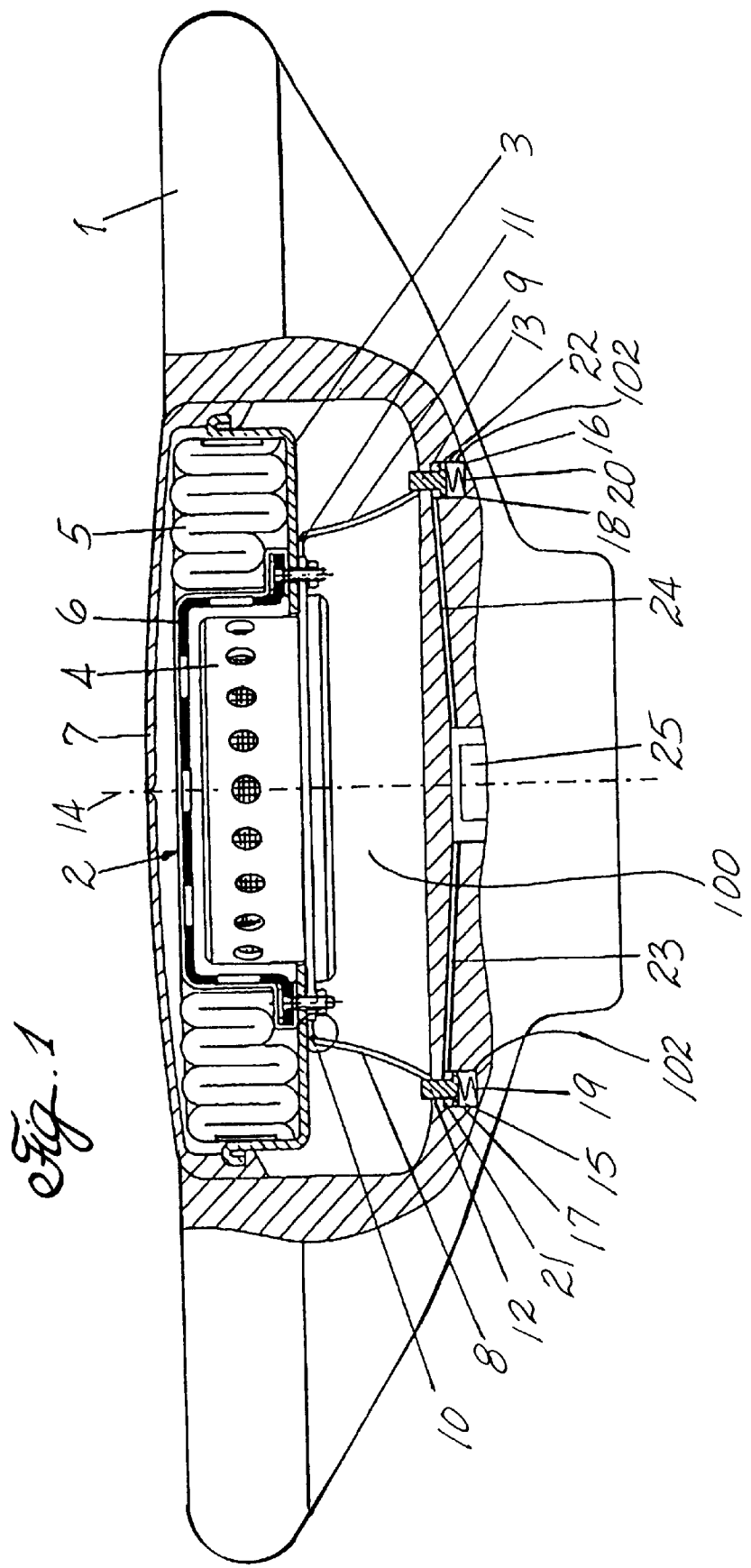

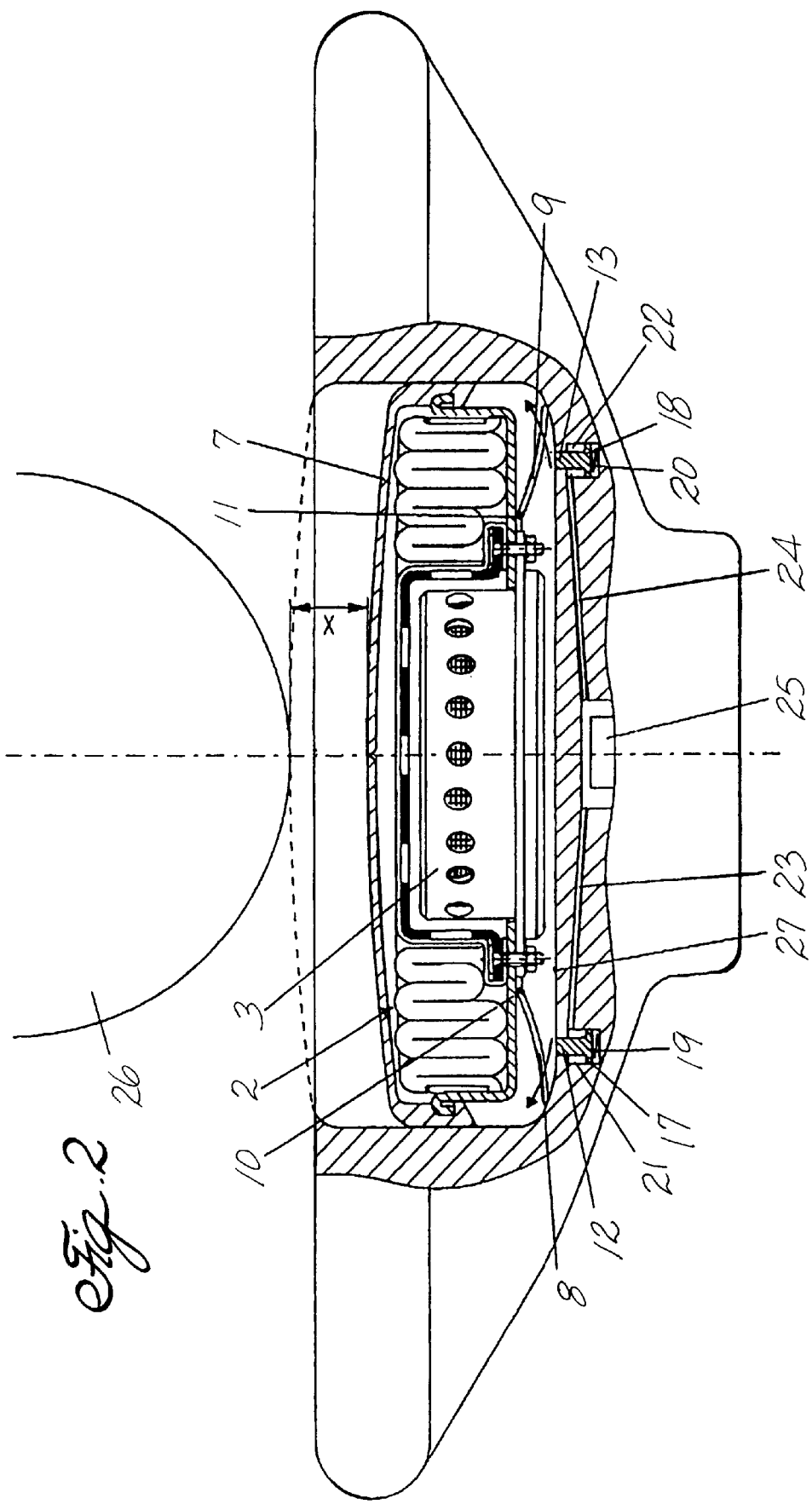

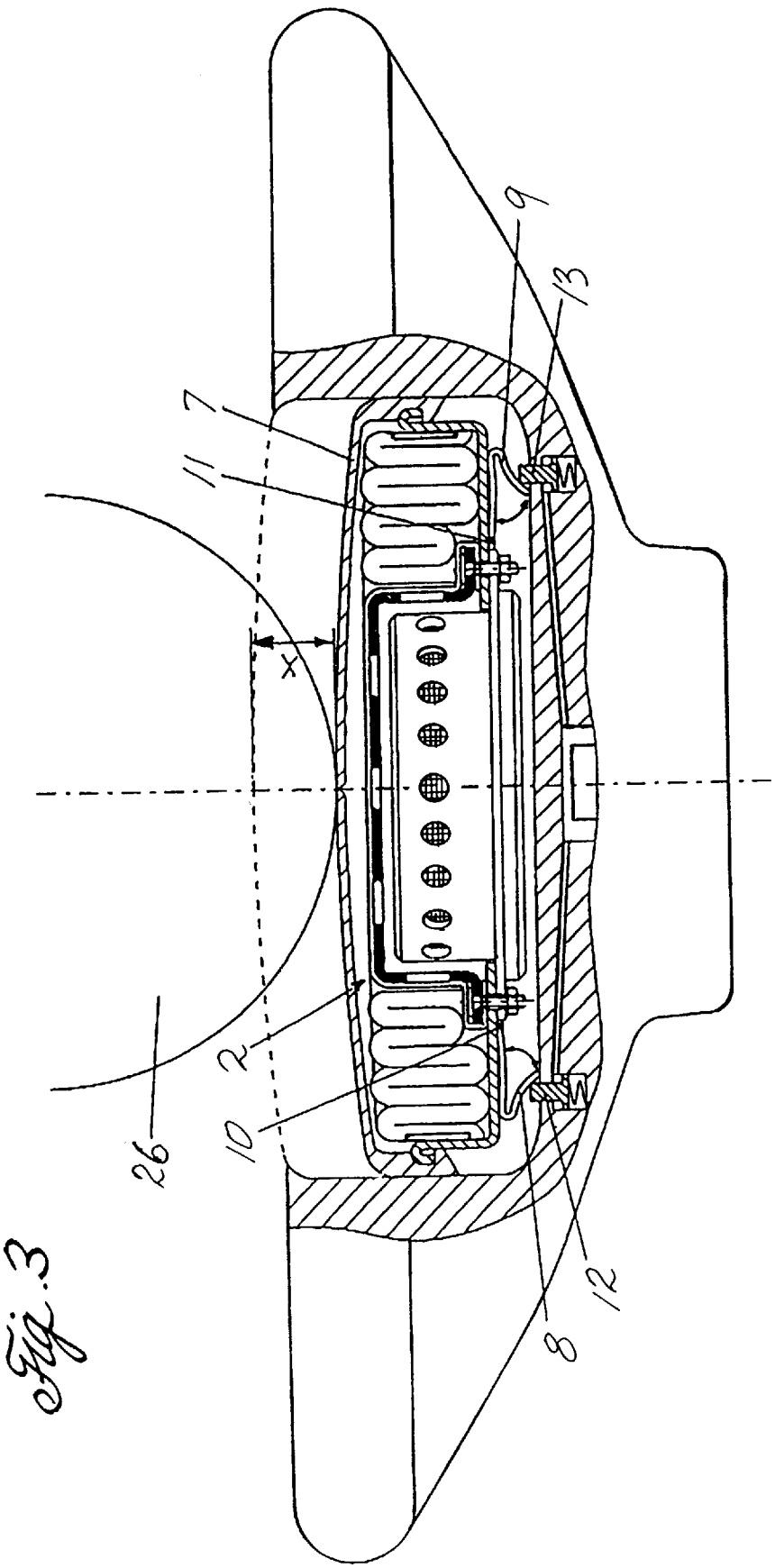

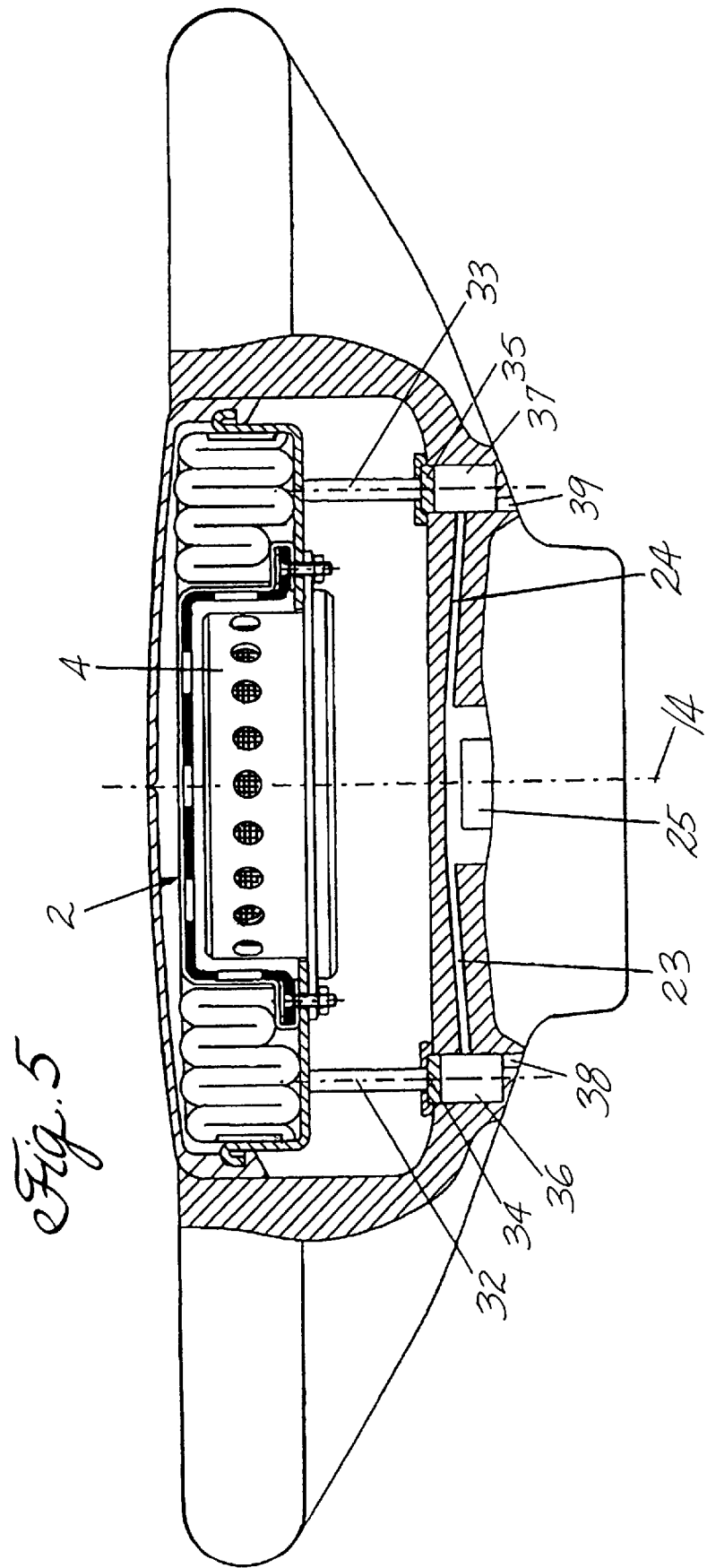

AIRBAG SYSTEM FOR MOTOR VEHICLES

BACKGROUND OF THE INVENTION

The invention relates to an airbag system for motor vehicles, and more particularly to an airbag having a gas generator which retracts in a cavity of the motor vehicle away from an occupant during a collision.

Gas bag systems, with which, in the event of an accident of the motor vehicle, a cushion automatically inflates in front of the occupant from activation of a gas generator, are known for both the driver's seat and the passenger's seat.

To ensure reliable protection of the occupant in the event of an impact of the motor vehicle, the cushion must be inflated in a very short time. In practice, the inflation takes place within a few milliseconds. This ensures that, in the event of an impact, the cushion is already inflated before the occupant is thrown in the direction of the cushion. The assumption is made that the occupant is sitting back in a normal position in the seat such that the occupant does not come into contact with the cushion during its inflation.

However, if the occupant has leaned forward during impact of the motor vehicle, his head may be positioned within the space provided for the inflation of the gas bag. Since the gas bag inflates rapidly, it is possible that parts of the covering cap may strike the occupant, whereby injuries may occur.

It is known from German Patent No. DE 42 27 559 A1 to inflate the gas bag with a comparatively slower expansion speed in the direction of the occupant (hereinafter the "axial direction") and with a comparatively greater expansion speed in the lateral direction. However, this arrangement has the disadvantage that the gas bag may not yet be fully inflated in the critical axial direction when the occupant is thrown forward upon impact, such that the gas bag does not provide adequate cushioning.

It is further known from U.S. Pat. No. 5,383,682 to mount the airbag system on a plastically deformable support. This support is deformable by means of a force which is applied thereto by the occupant after inflation of the airbag. With this arrangement as well, it is not possible to prevent the occupant from being hit by the deploying gas bag and being injured thereby.

From U.S. Pat. No. 4,200,309, a steering wheel is also known, whereby a box-type element is present inside the rim of the steering wheel, which element is deformable under the impact of an occupant's head. This is intended to reduce the risk of injury. The disadvantage of this steering wheel consists in that it can be effective only with slight decelerations of the vehicle, but that with rapid decelerations, such as occur in the event of a crash, injury is only insignificantly reduced. Further, an airbag for protection of the occupant in the event of a crash is not provided with this steering wheel.

SUMMARY OF THE INVENTION

According to one embodiment of the present invention, an airbag system for motor vehicles includes a gas sack and a gas generator for the gas sack, and at least one of which is shiftable by the occupant impacting the airbag system. One or more deformable and/or shiftable elements support the shiftable portion of the airbag system in the motor vehicle, for example the steering wheel. The shiftable portion may be shifted due to deformation the deformable and/or shiftable elements in response to an occupant impacting the airbag system with no ignition of the gas generator. The deformable and/or shiftable elements may also by an arrangement responsive to an ignition sequence of the gas generator and the gases emerging from the gas generator, such that the shiftable portion is shiftable by means of the gases emerging from the gas generator with a lower expenditure of force than with a slight deceleration of the vehicle and no ignition of the gas generator by action of the impacting occupant.

According to another embodiment of the invention, an airbag system is provided which eliminates or reduces the risk of injury to the occupant in a forward-leaning position without reducing the expansion speed of the gas bag in the axial direction and reduces the risk of injury even with slight decelerations of the vehicle in which the gas bag does not deploy.

According to another embodiment, an airbag system for motor vehicles includes an airbag assembly comprising a gas bag, a gas generator, and means for shifting at least a portion of the airbag assembly away from the occupant in the event of rapid deceleration of the vehicle, for example, a collision or sudden stop. According to this embodiment, the means for shifting requires less force to shift the portion of the airbag assembly if the gas generator ignites than if the airbag assembly is impacted by the occupant without ignition of the gas generator.

According to another embodiment, an airbag system for motor vehicles includes at least one gas bag and at least one associated gas generator in which the airbag system is at least partially shiftable due to impact by the occupant. The section of the airbag system which is shiftable due to impact by the occupant is attached to at least one deformable or shiftable element by means of the gases emerging from the gas generator or by impact of the occupant. Thus, the deformable or shiftable element is actuated by a relatively small amount of force. The impulse which is generated by gases emerging from the gas generator is, consequently, capable of quickly shifting the airbag system away from the occupant before the deployment of the gas bag. Thus, if the occupant is in a forward-leaning position, an open space is created between the gas generator and the occupant for the deployment of the gas bag. In the event of an impact of the occupant, a slower deformation or shifting occurs, whereby part of the energy of the impact is absorbed over time. Thus, the occupant impacting the airbag system is decelerated over the shifting path of the airbag system, even in the event of lower decelerations in which the airbag deployment is not yet triggered, such that the risk of injury is reduced for the occupant.

According to alternate embodiments, the entire airbag system is shiftable by the occupant or only the gas generator is shiftable by the occupant.

In another embodiment, at least one deformable element is pivotably mounted at one end on the airbag system and its other end lies against a stop which can be moved away from that end in the event of a crash. In this embodiment, the action of the deformable element of shifting the shiftable section in the event of a crash is facilitated at least partially in that the end of the deformable element lying against the stop is freely pivoted after withdrawal of the stop. Consequently, the airbag system can be readily shifted away from the occupant by means of the gases emerging from the gas generator. According to this embodiment, the stop is held in its working position by a spring, and in the event of a crash, the stop can be shifted away against the compressive force of the deformable element by an arrangement triggered by the vehicle deceleration. The first stage of a two-stage gas generator, a lever mechanism or an additional propellant charge may be provided as the arrangement for the diversion of the stop, whereby the last two are triggered before the deployment of the gas bag. This arrangement, along with the shiftable stop, comprises the aforementioned additional means to actuate the deformable element.

On the other pivotably attached end of the deformable element, a hinge or a point with reduced material strength can be provided as a pivot point. The pivoting of the deformable element is enabled by the weakness of the material as with a hinge. In an alternate embodiment, the deformable element is bent in an arcuate shape on its pivotably attached end and guided in a counterpart with corresponding arcuate curvature. Thus, guidance analogous to a ball joint is available.

In another embodiment, provision is made that the shiftable section of the airbag system is attached to at least one damping element, which cooperates with a damping medium, whereby the damping medium can be withdrawn from the damping element in the event of a crash. In this case, with slight vehicle deceleration, the same energy absorbing action as with the first embodiment is obtained through the compression or partial withdrawal of the damping means. In the event of a crash, the damping action is completely eliminated by withdrawal of the damping medium, such that the airbag system is quickly shifted away from the occupant under the action of the gases emerging from the gas generator.

Preferably provided as a damping element is a gas-pressure damper, which has a damping chamber and a piston movable therein, with which the shiftable section of the airbag system is connected, the damping chamber having a relief opening to be opened before deployment of the gas bag in the event of a crash. Either a first stage of a two-stage gas generator, a lever mechanism, or an additional propellant charge may be provided as an arrangement for the opening of the relief opening, thereby venting the damping medium, in this case air, in the damping chamber. Advantageously, two damping elements are disposed symmetrical to the longitudinal axis of the airbag system.

In another embodiment, provision is made that the airbag system is attached to at least one guide element shiftable away from the occupant, which is associated with at least one clamping unit, whereby the clamping force is dimensioned such that the guide element is shiftable under the pressure of the occupant impacting the airbag system with no ignition of the gas generator, and that in the event of a crash, the clamping unit can be withdrawn from the guide element before ignition of the gas generator. In this embodiment, with slight deceleration of the vehicle, the same effect as with the aforementioned embodiments is obtained by means of the clamping force on the shiftable guide element. In the event of a crash, the clamping unit is removed from the guide element such that the airbag system is quickly shifted away from the occupant under the action of the gas emerging from the gas generator. Either a first stage of a two-stage gas generator, a lever mechanism, or an additional propellant charge may be provided as an arrangement for the withdrawal of the clamping unit.

Advantageously, according to this embodiment, a central guide element, with which two opposing clamping units acting radially on the guide element are associated, is provided. In a preferred embodiment, provision is made that each clamping unit has a piston which can be pressed against the guide element by a spring and that an annular chamber is provided on the side of the piston opposite the spring, which chamber is linked by at least one channel with the site of the additional propellant charge. Advantageously, a friction lining is provided between the piston and the guide element. The clamping force may be altered within a wide range through the selection of compression of the spring and friction lining.

DESCRIPTION OF THE DRAWINGS

The foregoing features and advantages of the invention will be better understood by referring to the following drawings:

FIG. 1 is an airbag system for the driver's side with pivotable deformable elements according to one embodiment of the invention in the neutral position;

FIG. 2 is an airbag system according to FIG. 1 in the final bottom position after a vehicle crash in which the airbag is triggered;

FIG. 3 is an airbag system according to FIG. 1 in the final bottom position caused by impact by the occupant;

FIG. 5 is an airbag system for the driver's side in the neutral position with damping elements according to one embodiment of the invention.

DETAILED DESCRIPTION OF THE INVENTION

Figure 4A:
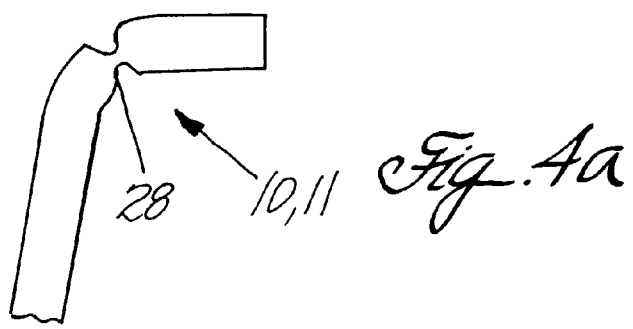
FIGS. 4a–4c are alternate embodiments of the pivot point of the deformable element.

In one embodiment according to the present invention illustrated in FIG. 1, an airbag system 2 is provided in a steering wheel 1. The airbag system includes a generator support 3 supporting a gas generator 4 and a folded gas bag 5 separated by a diffuser 6. The airbag system is positioned disposed under a covering cap 7 in the steering wheel and housed in a support cavity 100.

Two deformable elements 8, 9, which are pivotable on their upper ends at pivot points 10, 11, are attached on the bottom of the airbag system. The deformable elements are preferably flat strips of material that extend outward and downward at an angle from the pivot points. Stops 12, 13, which are movable in the direction of an axis 14 of the steering wheel, engage in the neutral position depicted. The stops 12, 13 extend outward and upward from chambers 15, 16. Chambers 15, 16 house pistons 17, 18, which cooperate with springs 19, 20 at one end. On the other end of the pistons, annular chambers 21, 22 are provided which are connected via channels 23, 24 with a chamber containing an additional propellant charge 25. Between the upper boundary of the annular chambers 21, 22, and the pistons 17, 18, support points (not shown), are provided.

In the event of a crash (FIG. 2), the additional propellant charge 25 is ignited with the help of time-offset sensors (not shown) prior to ignition of the gas generator. The emerging gas passes through the channels 23, 24 into the annular chambers 21, 22 and exerts downward pressure on the pistons 17, 18. Preferably the pistons 17, 18 have heads 102 substantially sealed in annular chambers 21, 22 such that the gas emerging from the channels 23, 24 above the piston heads 102 act on the piston heads to force the pistons 17, 18 down. Thus, the stops 12, 13 are moved downward against the force of the springs 19, 20, such that the lower ends of the deformable elements 8, 9 are freed to slide along the bottom of the support cavity 100. After ignition of the gas generator 4, the airbag system 2 including the covering cap 7 can be moved a distance X away from the occupant by means of the impulse of the gases emerging from the gas generator with low expenditure of force. Since the deformable elements 8, 9 can no longer be supported against the stops, they slide on the floor 27 of the space for the airbag system and pivot outward around the pivot points 10, 11. The pivot points are designed such that they offer little sliding resistance.

In the event the vehicle deceleration is so slight that the gas generator and the additional propellant charge are not ignited (FIG. 3), the stops 12, 13 remain in their neutral position, such that the bottom ends of the deformable elements 8, 9 are biased upward by the springs 19, 20. A force is introduced onto the deformable elements 8, 9 by the occupant hitting the airbag system 2. Since these elements are pressed against the stops, they are both pivoted at their other ends around the pivot points 10, 11 and bent such that they have a shape approximated by that depicted in FIG. 3. Accordingly, the airbag system 2, including the covering cap 7, is moved the distance X away from the occupant. The deformable elements 8, 9 are designed to bend at a given rate such that the occupant is decelerated with a force largely tolerable for him during the shifting of the airbag module by the distance X.

Figure 4B:
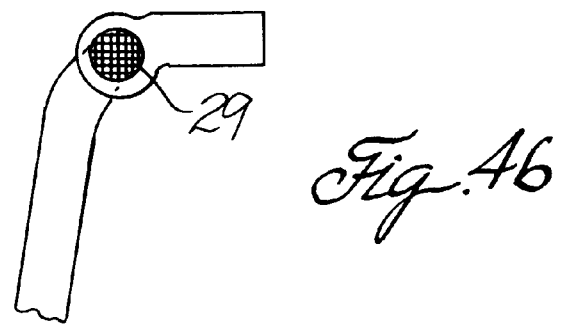
Figure 4C:
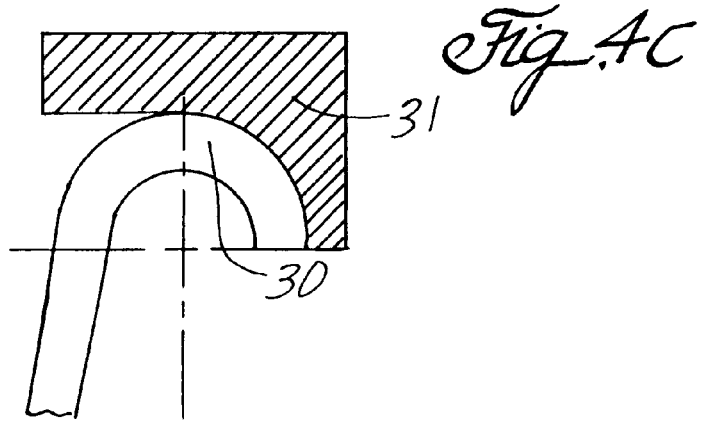

In FIGS. 4a–4c, embodiments of the deformable elements at the pivot points 10, 11 are depicted. In the embodiment of FIG. 4a, the rotation is enabled by a point 28 on the deformable element 8 with a relatively low material thickness. The pivoting of the deformable elements occurs through their bending in this area. In the embodiment of FIG. 4b, a hinge 29 is provided at the pivot point such that the rotation represents a pure hinge movement. In the embodiment of FIG. 4c, the deformable elements have an end 30 in the region of the pivot point which is bent in the form of a segment of a circle, with which a corresponding concave curvature is associated in a counterpart 31. In this curvature, the deformable element can rotate like a ball joint.

In the embodiment of FIG. 5, the airbag system 2 is disposed on damping elements 32, 33, which are shiftable along the direction of the steering wheel axis 14. The damping elements 32, 33 each have a piston 34, 35, whereby each piston is guided in a damping chamber 36, 37. By means of the pressure of the air contained therein in cooperation with the pistons 34, 35, the airbag system is held in the neutral position depicted. The damping chambers contain relief openings 38, 39 which are closed when the airbag system is in the neutral position. Also, the damping chambers are connected via channels 23, 24 to a chamber with an additional propellant charge 25.

To ensure that the airbag system maintains the neutral position of FIG. 5, the intake openings of the channels 23, 24 into the damping chambers are also closed.

In the event of a crash, the additional propellant charge 25 is ignited via known time-offset sensors (not shown) prior to the ignition of the gas generator 4. The pressure impulse of the additional propellant charge results in a sudden rise in pressure in the channels 23, 24, such that first the openings to the damping chambers 36, 37 are cleared and then the relief openings 38, 39 are cleared. Thus, air in the damping chambers is vented and the pressure in the damping chambers 36, 37 is reduced, allowing the following thrust on the gas generator from the emerging gases to move the airbag system away from the occupant against low resistance.

In the event of a slight deceleration of the vehicle, whereby neither the additional propellant charge 25 nor the gas generator is ignited, the relief openings 38, 39 and the intake openings of the channels 23, 24 into the damping chambers 36, 37 remain closed. The occupant hitting the airbag system still is decelerated by the shifting of the airbag system, since the air present in the damping chambers 36, 37 is compressed by the pistons 34, 35, but the airbag system 2 is moved at a slower rate due to the damping effect of the air compressed in the chambers. The shifting of the airbag module 2 in the event of a crash and in the event of slight deceleration of the vehicle is not depicted, since it corresponds to the shifting depicted in FIGS. 2 and 3.

Figure 6:
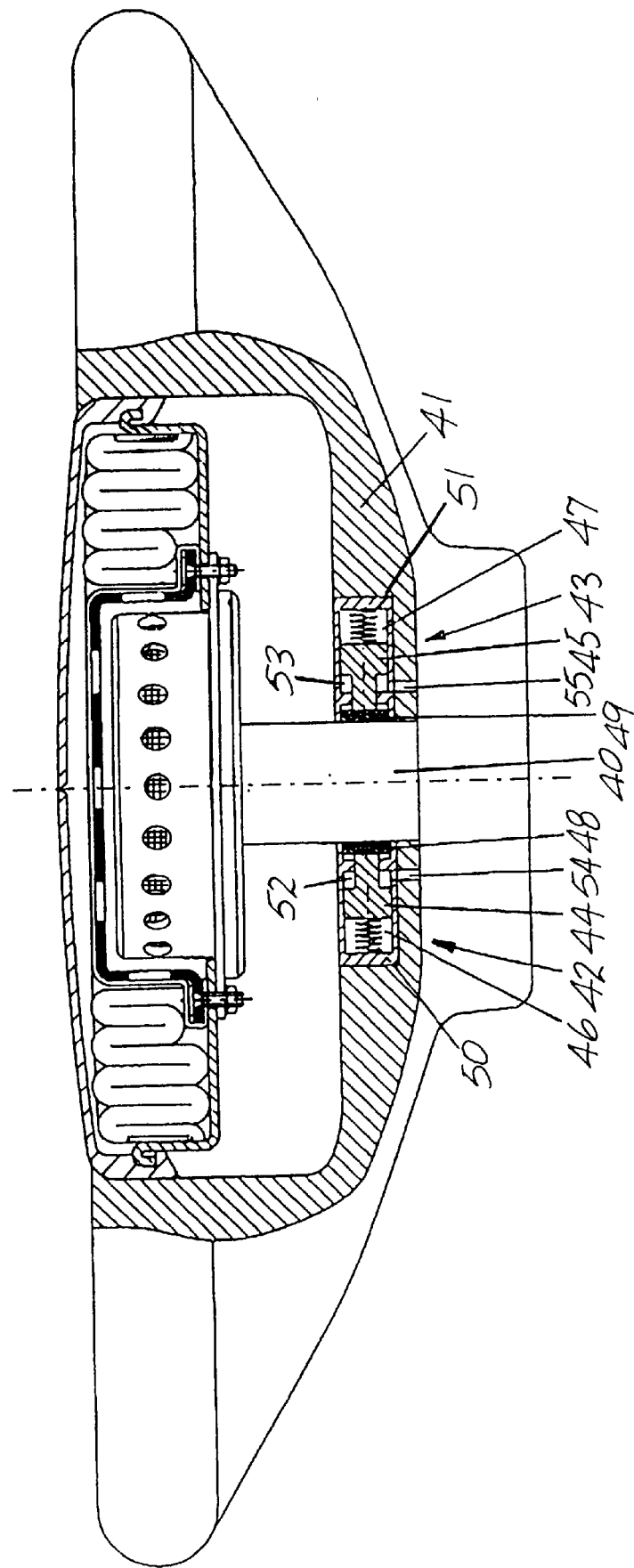
FIG. 6 is an airbag system for the driver's side with a guide element according to one embodiment of the invention which may be influenced by a clamping unit.

In the embodiment in FIG. 6, the airbag system is attached to a guide element 40, which is guided in a steering wheel hub 41. The guide element is fixed in the neutral position by two radially disposed clamping units 42, 43. The clamping units 42, 43 have pistons 44 and 45, respectively, which are guided in a chamber 46 or 47, respectively. The clamping elements have, on their end facing the guide element 40, a friction lining 48 and 49, respectively, and are pressed by means of springs 50 and 51, respectively, which press against the pistons 44, 45, with a force, determined by the selected spring constant, against the guide element 40. On the other end of the pistons 44, 45 are annular chambers 52, 53 which are connected via channels 54, 55 with a chamber (not shown) with an additional propellant charge.

In the event of a crash, as in the previously described embodiments, the additional propellant charge is ignited with a time offset prior to ignition of the gas generator. The gases emerging from the gas generator drive the pistons 44, 45 radially outward, such that the friction linings 48, 49 are moved away from the guide element 40. The clamping of the guide element 40 is thus released. The following impulse of the gases emerging from the gas generator can freely shift the airbag system downward.

With slight vehicle deceleration, the friction linings 48, 49 continue to be pressed by means of the pistons 44, 45 by the force of the springs 50, 51 against the guide element 40 as in the neutral position. The occupant hitting the airbag system is decelerated by the frictional forces from the friction linings over the shifting path of the airbag system. Hence, the necessary force for the shifting of the airbag system is greater than in the event of a crash.

In this embodiment as well, the shifting of the airbag module in the event of a crash and in the event of a slight vehicle deceleration is not shown, since it corresponds to the shifting depicted in FIGS. 2 and 3.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

The disclosure of attached German patent application No. 197 20 149.0, filed on May 2, 1997, is incorporated fully herein by reference. Priority of this German application is claimed.

What is claimed is:

1. An airbag system for motor vehicles comprising:
   at least one gas sack;
   at least one gas generator operatively connected to the gas sack;
   a shiftable portion, shiftable by the occupant, comprising at least one of the at least one gas sack and the at least one gas generator;
   at least one moveable deformable element supporting the shiftable portion, wherein, with no ignition of the gas generator;

at least one moveable deformable element supporting the shiftable portion, wherein, with no ignition of the gas generator, the shiftable portion is shiftable due to deformation and movement of the at least one deformable element in response to an occupant impacting the airbag system; and means, in response to great deceleration of the vehicle sufficient to cause ignition of the gas generator, for lowering the expenditure of force needed to move the at least one deformable element and thereby to shift the shiftable portion;

wherein the shiftable portion is shiftable with a lower expenditure of force by means of the gases emerging from the gas generator than with a slight deceleration of the vehicle and no ignition of the gas generator by action of the impacting occupant.

2. The airbag system according to claim 1 wherein the shiftable portion comprises the at least one gas sack and the at least one gas generator.

3. The airbag system according to claim 1 wherein the at least one gas generator is shiftable by the occupant.

4. The airbag system according to claim 1 wherein the airbag system is housed in a support cavity including a surface having mounted thereon a retractable stop which retracts upon great deceleration of the vehicle sufficient to cause ignition of the gas generator, and wherein the at least one deformable element comprises a first end pivotably mounted to the shiftable portion and a second end which is supported by the support cavity surface and which abuts the retractable stop.

5. The airbag system according to claim 4 wherein the means for shifting the shiftable portion comprises:
- a chamber located below the supporting cavity surface, the chamber housing the retractable stop;
- a spring in the chamber in contact with the retractable stop and which biases the retractable stop in a non-retracted position; and
- means for propelling the retractable stop against the spring and into the chamber in response to the ignition sequence of the gas generator such that the second end of the at least one deformable element is free to slide along the surface of the supporting cavity, thereby shifting the shiftable portion.

6. The airbag system according to claim 5 wherein the retractractable stop comprises a head and wherein the means for propelling the retractable stop comprises a propellant charge having an outlet for propellant discharge in the chamber on a side of the retractable stop head opposite the spring.

7. The airbag system according to claim 4 wherein a hinge is provided on the first end of the at least one deformable element as a pivot point.

8. The airbag system according to claim 4 wherein a portion of lower material thickness is provided on the first end of the at least one deformable element as a pivot point.

9. The airbag system according to claim 4 wherein the deformable element has a pivotable first end that is bent in an arcuate shape and guided in a counterpart having corresponding arcuate curvature.

10. An airbag system for motor vehicles comprising:
- at least one gas sack;
- at least one gas generator operatively connected to the gas sack;
- a shiftable portion, shiftable by the occupant, comprising at least one of the at least one gas sack and the at least one gas generator;
- at least one shiftable damping element supporting the shiftable portion;
- means for damping shifting of the damping element, with no ignition of the gas generator, in response to an occupant impacting the airbag system; and
- means, in response to great deceleration of the vehicle sufficient to cause ignition of the gas generator, for reducing the damping effect of the damping means in order to more readily shift the at least one damping element and thereby to shift the shiftable portion;

wherein the shiftable portion is shiftable with a lower expenditure of force by means of the gases emerging from the gas generator than with a slight deceleration of the vehicle and no ignition of the gas generator by action of the impacting occupant.

11. The airbag system according to claim 10 wherein the damping means comprises a gas-pressure damper, which includes a damping chamber comprising a damping medium and a relief opening, and wherein the damping element comprises a piston movable therein.

12. The airbag system according to claim 11 wherein the means for shifting the at least one damping element comprises a first stage of a two-stage gas generator operatively connected to the relief opening for opening the relief opening.

13. The airbag system according to claim 11 wherein the means for shifting the at least one damping element comprises a propellant charge operatively connected to the relief opening for opening the relief opening.

14. The airbag system according to claim 10 wherein two damping elements are disposed symmetrically away from a longitudinal axis of the airbag system.

15. The airbag system according to claim 10 wherein the damping element comprises a guide element, and the damping means comprises at least one clamping unit, wherein the at least one clamping element presses with friction against the guide element to dampen shifting of the guide element in response to the occupant impacting the airbag system with no ignition of the gas generator, and wherein the means for shifting the at least one damping element by reducing the damping effect of the damping means comprises means for withdrawing the at least one clamping element at least partially from the guide element.

16. The airbag system according to claim 15 wherein the at least one clamping unit comprises a piston operatively connected to a spring which biases the piston to press against the guide element, and wherein the means for shifting the at least one damping element by reducing the damping effect of the damping means comprises an annular chamber operatively connected to a first stage of a two-stage gas generator which provides a gas discharge responsive to the ignition sequence of the gas generator, said annular chamber provided on a side of the piston opposite the spring.

17. The airbag system according to claim 15 wherein the at least one clamping unit is housed in a chamber.

18. The airbag system according to claim 15 wherein the at least one clamping unit comprises a piston operatively connected to a spring which biases the piston to press against the guide element, and wherein the means for shifting the at least one damping element by reducing the damping effect of the damping means comprises an annular chamber operatively connected to a propellant charge responsive to the ignition sequence of the gas generator, said annular chamber provided on a side of the piston opposite the spring.

19. The airbag system according to claim 15 wherein two opposing clamping units act radially on the guide element which is positioned centrally on the shiftable portion.

20. The airbag system according to claim 19 wherein a friction lining is provided between the piston and the guide element.

* * * * *